(12) United States Patent
Pirner (10) Patent No.: US 10,060,568 B2
(45) Date of Patent: Aug. 28, 2018

(54) PIPELINE INSPECTION GAUGE

(71) Applicant: Paul Pirner, Mississauga (CA)

(72) Inventor: Paul Pirner, Mississauga (CA)

(*) Notice: Subject to any disclaimer, the term of this patent is extended or adjusted under 35 U.S.C. 154(b) by 88 days.

(21) Appl. No.: 15/151,330

(22) Filed: May 10, 2016

(65) Prior Publication Data

US 2016/0334297 A1     Nov. 17, 2016

Related U.S. Application Data

(60) Provisional application No. 62/160,052, filed on May 12, 2015.

(51) Int. Cl.
| | |
|---|---|
| *F16L 55/26* | (2006.01) |
| *F16L 55/28* | (2006.01) |
| *F16L 55/40* | (2006.01) |
| *F16L 55/42* | (2006.01) |

(52) U.S. Cl.
CPC .............. *F16L 55/26* (2013.01); *F16L 55/265* (2013.01); *F16L 55/28* (2013.01); *F16L 55/40* (2013.01); *F16L 55/42* (2013.01)

(58) Field of Classification Search
CPC ......... F16L 55/26; F16L 55/28; F16L 55/265; F16L 55/40; F16L 55/42
See application file for complete search history.

(56) References Cited

U.S. PATENT DOCUMENTS

| | | | | |
|---|---|---|---|---|
| 2003/0041400 A1* | 3/2003 | Knapp | ................. | B08B 9/0557 |
| | | | | 15/104.061 |
| 2006/0248966 A1* | 11/2006 | Houldey | ................ | F16L 55/28 |
| | | | | 73/865.8 |

FOREIGN PATENT DOCUMENTS

| | | | | | |
|---|---|---|---|---|---|
| GB | 2040459 A | * | 8/1980 | ............... | G01B 5/12 |
| GB | 2429254 A | * | 2/2007 | ............. | F16L 55/28 |

* cited by examiner

*Primary Examiner* — Lisa Caputo
*Assistant Examiner* — David Z Huang
(74) *Attorney, Agent, or Firm* — Avery N. Goldstein; Blue Filament Law, PLLC (57) ABSTRACT

The apparatus comprises a pipe PIG and a gauge. The PIG is for use with a pipeline and is of the type including: a body defining a longitudinal axis; and a pair of seals connected to the body and axially spaced apart from one another by the body. The gauge: has a longitudinal axis; has an outer periphery through which the longitudinal axis of the gauge passes centrally; has a central position relative to the body wherein the longitudinal axis of the body and the longitudinal axis of the gauge are at least substantially coincident; and is mounted to the body for generally radial movement relative to the central position.

10 Claims, 12 Drawing Sheets

TOP VIEW
FIG. 8

PIPELINE INSPECTION GAUGE

FIELD OF THE INVENTION

The invention relates to the field of pipelines.

BACKGROUND OF THE INVENTION

In the field of pipelines, it is known to use a pipeline inspection gauge (PIG). These devices are typically each defined by a pair of seals that are spaced apart from one another by an intermediate body. In use, a PIG is forced down a pipeline by the fluid flowing therein.

Passage of the PIG through a length of pipeline scours the walls somewhat. Accordingly, regular passage of PIGS through pipelines can avoid fouling and improve flow.

When a PIG placed in a pipeline fails to travel as expected, it is indicative of a need for further examination and possibly, of repair.

It is also known to fit a PIG with a gauge plate. When a PIG of this type is passed through a length of pipeline and exits with a deformed gauge plate, it can be indicative of a partial blockage, but false positives are known to occur.

SUMMARY OF THE INVENTION

Forming one aspect of the invention is apparatus for use with a pipeline. This apparatus comprises a pipe PIG and a gauge. The PIG is for use with the pipeline and is of the type including: a body defining a longitudinal axis; and a pair of seals connected to the body and axially spaced apart from one another by the body. The gauge: has a longitudinal axis; has an outer periphery through which the longitudinal axis of the gauge passes centrally; has a central position relative to the body wherein the longitudinal axis of the body and the longitudinal axis of the gauge are at least substantially coincident; and is mounted to the body for generally radial movement relative to the central position.

According to another aspect of the invention, the apparatus can further comprise a guide mechanism adapted to hold the gauge in at least substantially equally spaced relation to the pipeline in use.

According to another aspect of the invention, the guide mechanism can be defined by a plurality of leaf springs operatively rigidly connected to the gauge According to another aspect of the invention, the gauge can be a plate having a circular outer circumference.

According to another aspect of the invention, the plate can have an annular outer portion bounded exteriorly by the circumference, the outer portion being segmented by a plurality of radially extending slots.

According to another aspect of the invention, the gauge can be mounted to the body for pivotal movement about a point at least substantially coincident with the longitudinal axis of the body.

According to another aspect of the invention, the gauge can be mounted to the body via a knuckle, the knuckle being mounted to the body for pivotal movement around a first axis perpendicular to the longitudinal axis of the body, the gauge being mounted to the knuckle for pivotal movement around a second axis perpendicular to the longitudinal axis of the body and to the first axis.

According to another aspect of the invention, the seals can be annular discs.

According to another aspect of the invention, the seals can be cups.

According to another aspect of the invention, the seals can be flexible and resilient.

Further details, characteristics and advantages of the invention will become evident upon a review of the following detailed description and the appended drawings, the latter being briefly described hereinafter.

DETAILED DESCRIPTION

Figure 3:
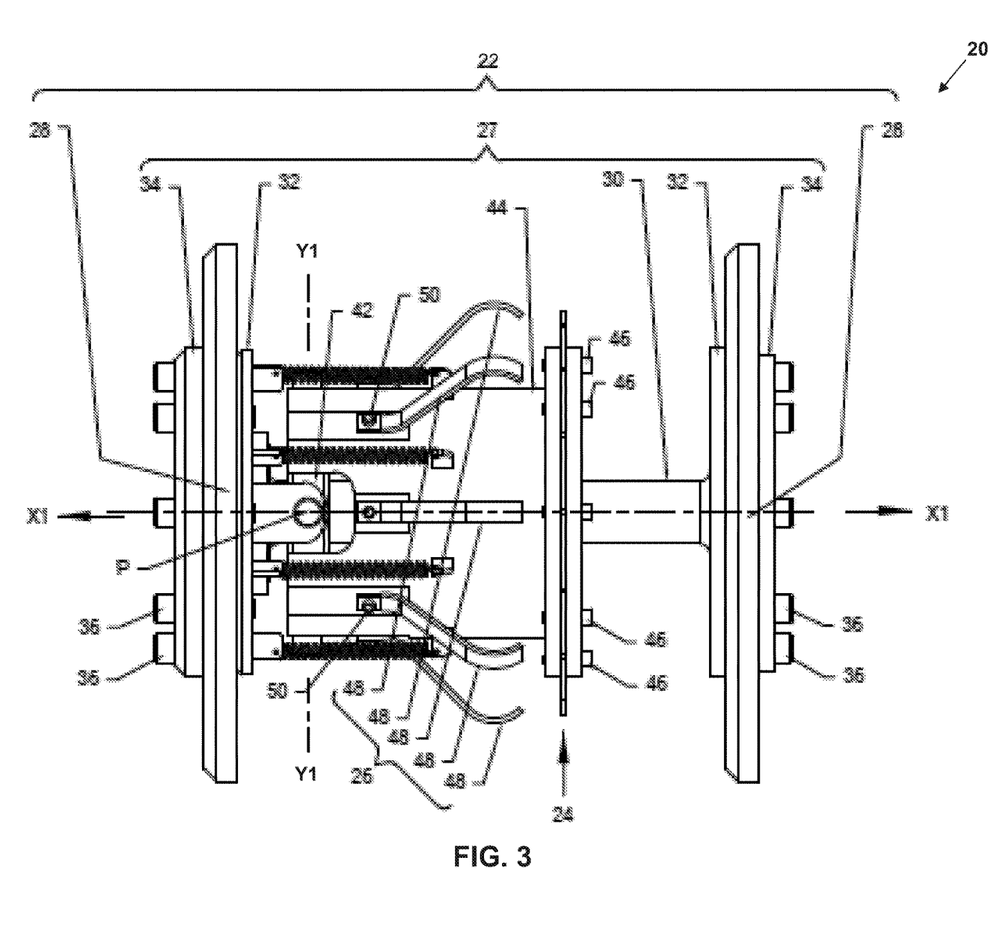
FIG. 3 is a view along arrow 3 of FIG. 2.
Figure 4:
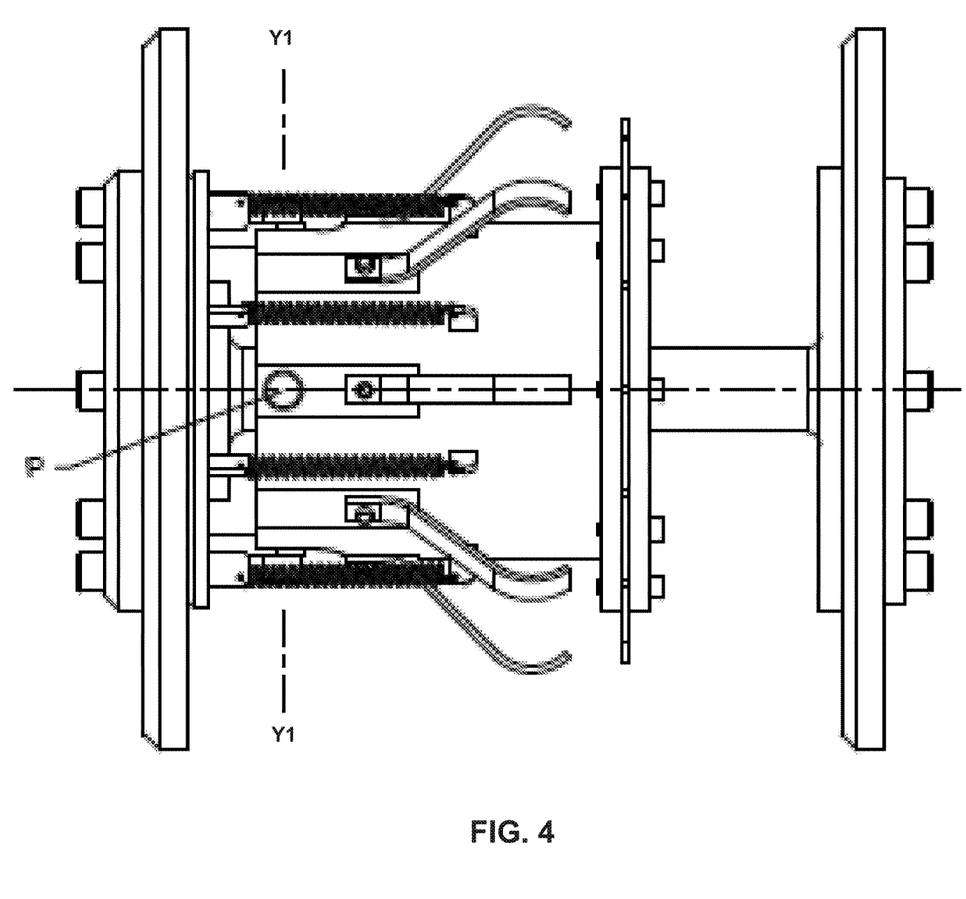
FIG. 4 is a view along arrow 4 of FIG. 2.
Figure 5:
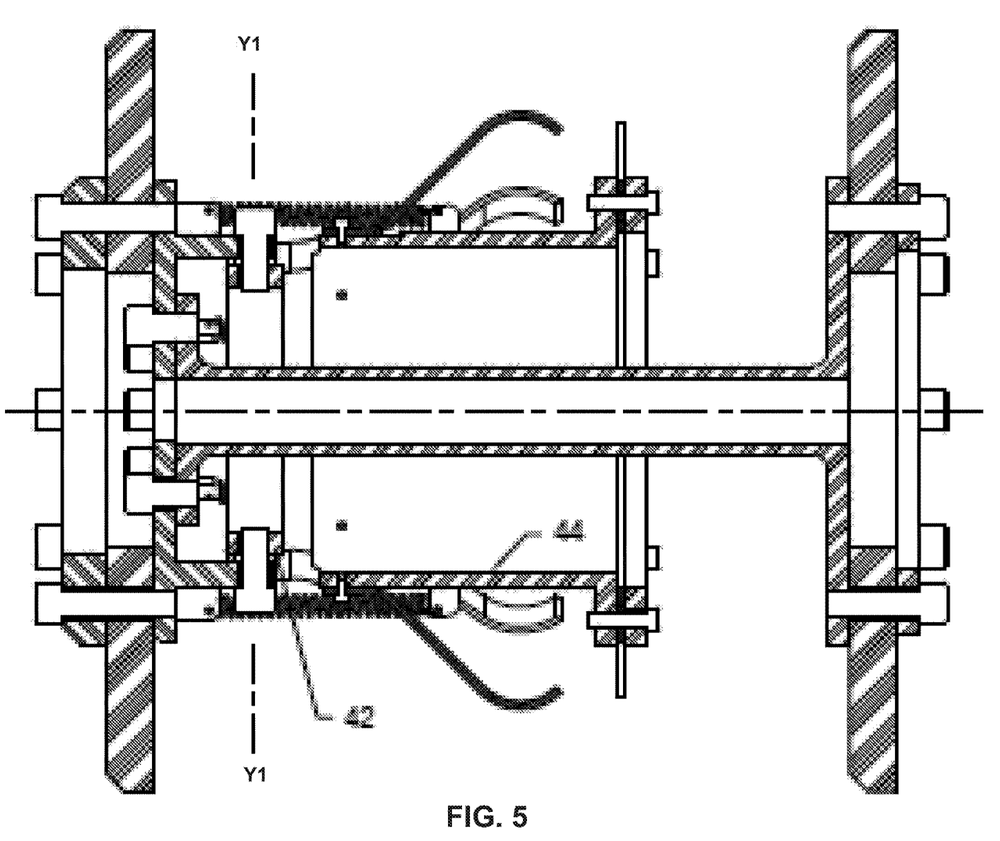
FIG. 5 is a view along section 5-5 of FIG. 2.

Shown in FIGS. 1 to 6 is an exemplary embodiment of the invention, designated with general reference numeral 20, which will be seen to include a PIG 22, a gauge 24 and a guide mechanism 26, all as indicated in FIG. 3.

With reference to FIG. 3, the PIG 22 includes a body 27 and a pair of resilient seals 28.

The body 27 has: a hollow tubular portion 30 that surrounds and defines a longitudinal axis X1-X1; a pair of end plates 32, axially spaced apart from one another and rigidly secured to the tubular portion 30; and a pair of seal clamping plates 34, each secured by bolts 36 to a respective one of the end plates 32.

The resilient seals 28 are defined by annular discs of flexible material and each is disposed in sandwiched relation between a respective one of the end plates 32 and the seal clamping plate 34 secured thereto. The seals 28 are thereby connected to the body 27 and spaced apart from one another along axis X1-X1 by the body 27.

Figure 1:
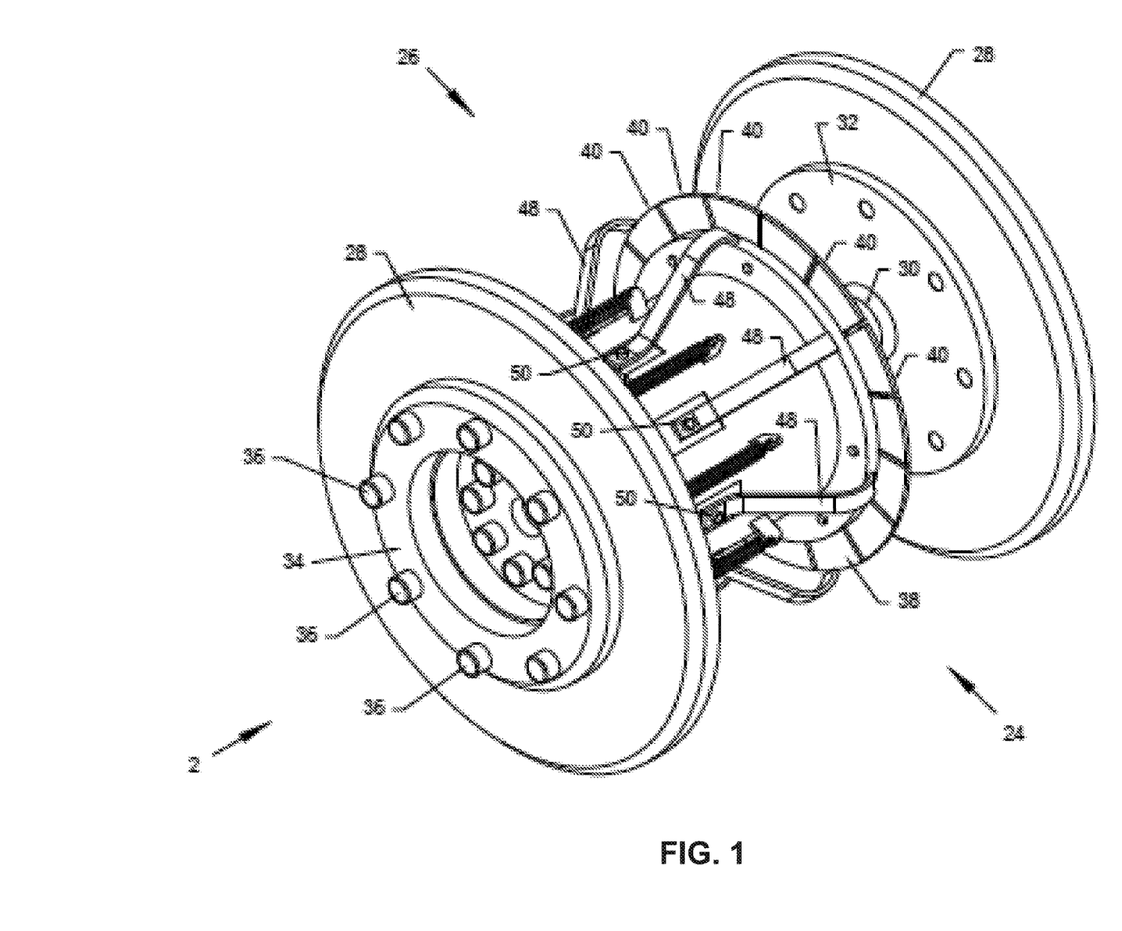
FIG. 1 is a perspective view of apparatus according to an exemplary embodiment of the invention.
Figure 2:
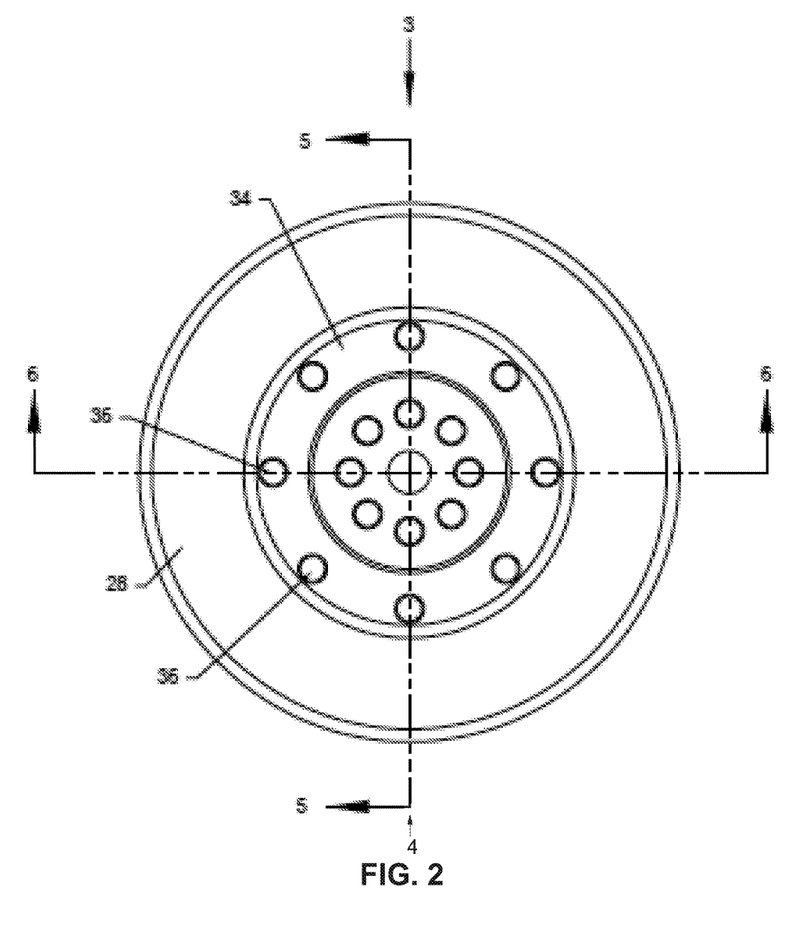
FIG. 2 is a view along arrow 2 of FIG. 1.
Figure 6:
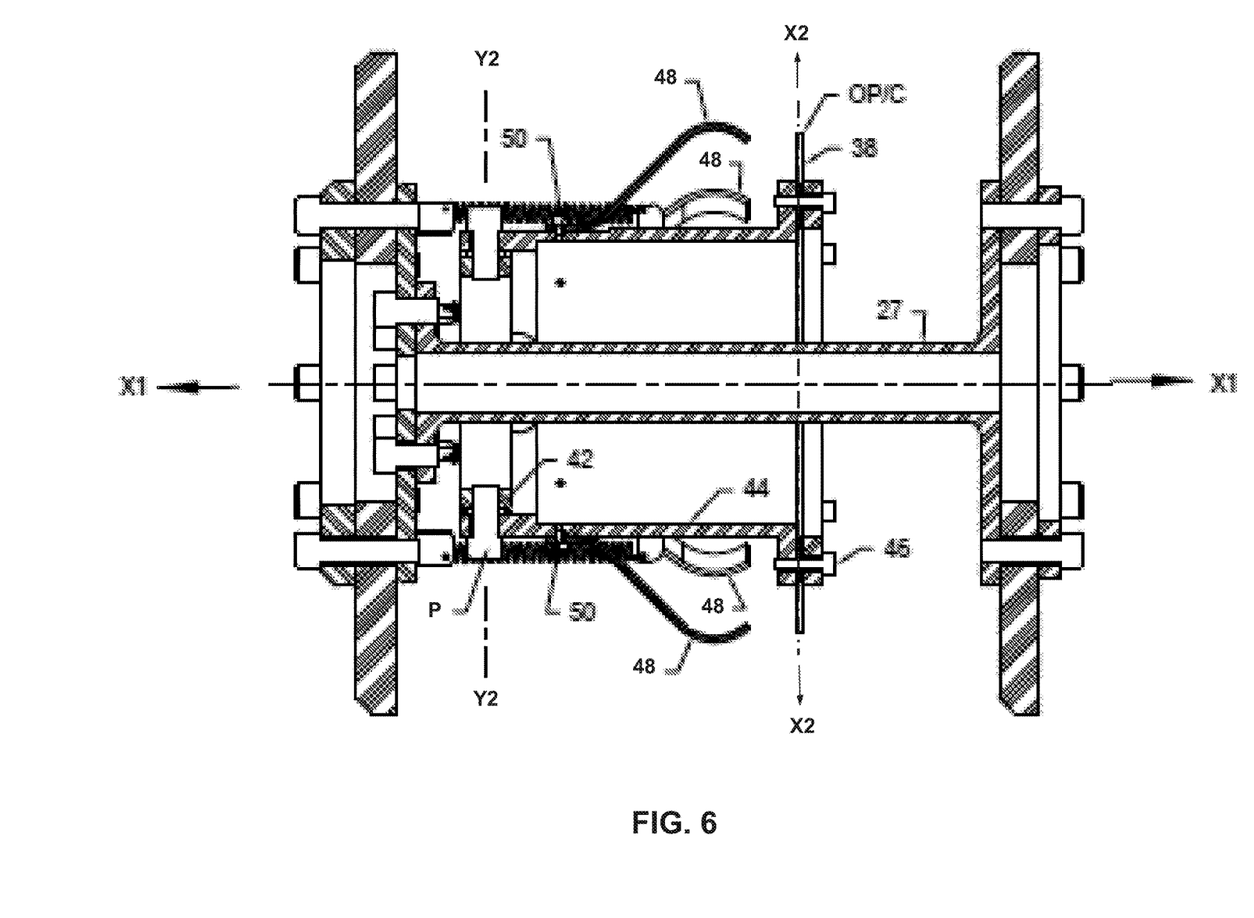
FIG. 6 is a view along section 6-6 of FIG. 2.

As seen in FIG. 6, the gauge 24: has a longitudinal axis X2-X2; has an outer periphery OP through which the longitudinal axis X2-X2 of the gauge 24 passes centrally; has a central position [shown in FIGS. 1-6] relative to the body 27 wherein the longitudinal axis X1-X1 of the body and the longitudinal axis X2-X2 of the gauge 24 are coincident; is a plate having a circular outer circumference C, the plate having an annular outer portion 38 bounded exteriorly by the circumference, the outer portion 38 being segmented by a plurality of radially extending slots 40 (best seen in FIG. 1).

Figure 7:
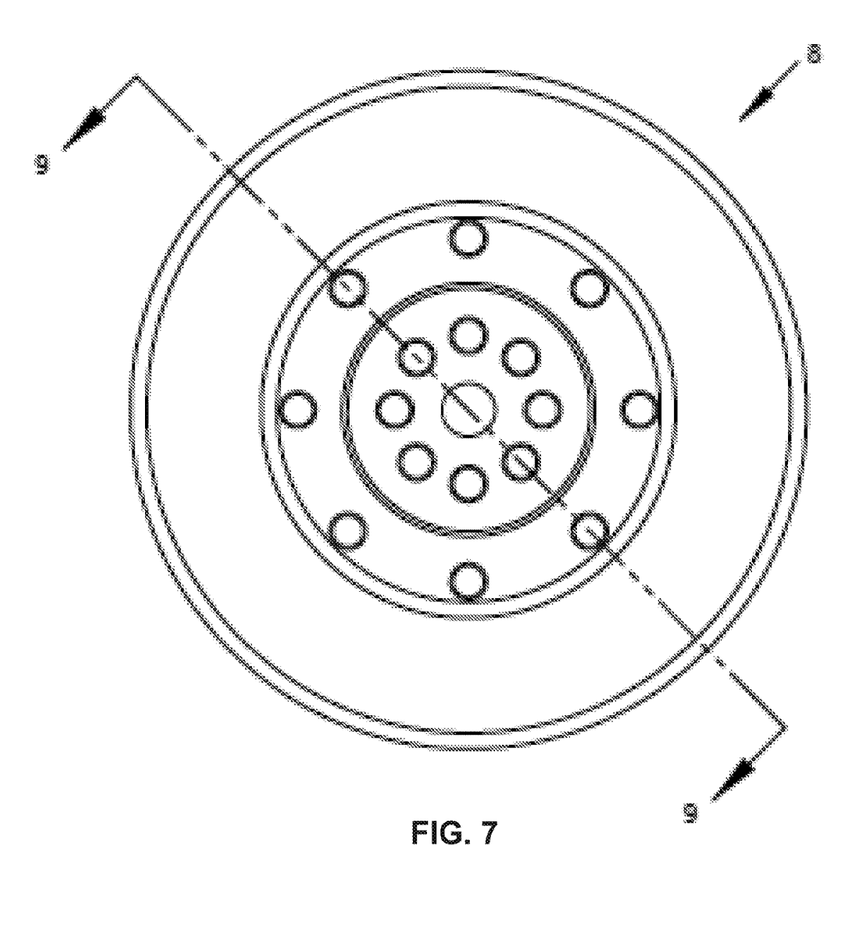
FIG. 7 is a view similar to FIG. 2 of the apparatus of FIG. 1, in an articulated configuration.
Figure 8:
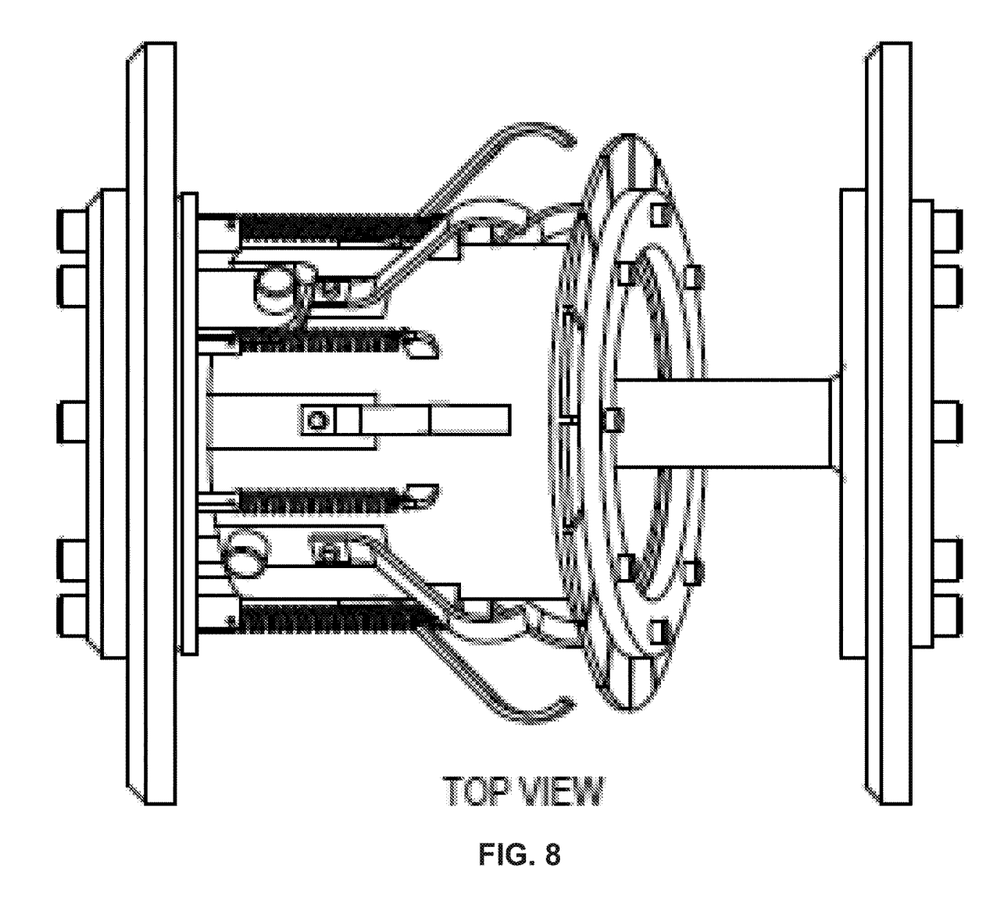
FIG. 8 is a view along arrow 8 of FIG. 7.

The gauge 24 is mounted to the body 27 for pivotal movement about a point P coincident with the longitudinal axis X1-X1 and relatively distal from the gauge 24, and is thereby mounted to the body 27 for generally radial movement relative to the central position. The gauge 24 is shown in an exemplary articulated position in FIGS. 7-9, but it will be understood that the gauge 24 can assume many positions relative to the body 27, limited only by the geometry of the various components. In such regard, it will be understood that, with reference to FIGS. 5 and 6, to provide for such mounting, the gauge 24 is mounted to body 27 via a knuckle 42 and a carrier 44. The knuckle 42 is mounted to the body 27 for pivotal movement around a first axis Y1-Y1 perpendicular to the longitudinal X1-X1 axis; the carrier 44 is mounted to the knuckle 42 for pivotal movement around a second axis Y2-Y2 perpendicular to the longitudinal axis X1-X1 and to the first axis Y1-Y1; and the gauge 24 is mounted to the carrier 44 by bolts 46. It will be appreciated that the knuckle and the pivots define a single universal joint.

The guide mechanism 26 will be seen to be defined by a plurality of leaf springs 48 rigidly secured to the carrier 44 by bolts 50 and thereby operatively rigidly connected to the gauge 24.

In use, the apparatus will be sized such that the outer limits of the springs 48 are set to, and the periphery of the gauge 24 is sized in accordance with the design needs of the pipeline in question. For example, some pipeline operators may be content with obstructions no more than 5% of total diameter, in which case the gauge would be sized at 95% of nominal diameter of the pipeline. The springs will be large enough to protect the gauge, but small enough to avoid undue wear; a diameter half way between pipe ID and gauge OD, for example, would be useful.

Figure 10:
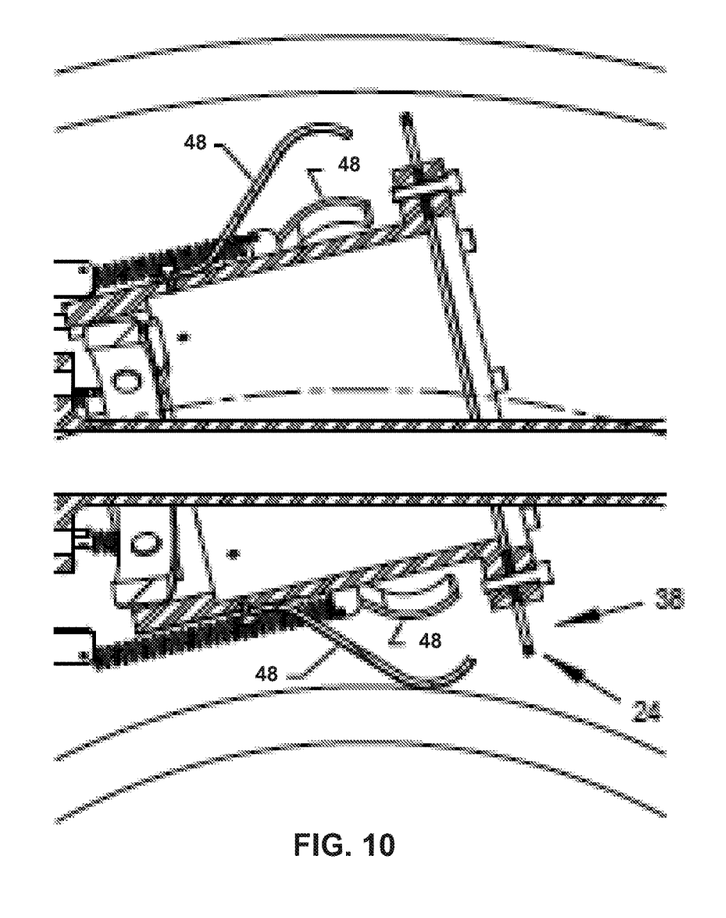
FIG. 10 is a view, similar to FIG. 6, showing the structure of FIG. 1 in use.

In use, the leaf springs will attempt to hold the gauge generally in equally spaced relation to the pipeline, both in linear portions of the pipeline, not shown, and in curved portions of the pipeline, as shown in FIG. 10.

Persons of ordinary skill will appreciate that, the ability of the gauge to float within the pipeline, particularly when traversing curved portions, will tend to reduce false positives, i.e. gauge damage associated with pipe bends rather than internal blockages.

Figure 9:
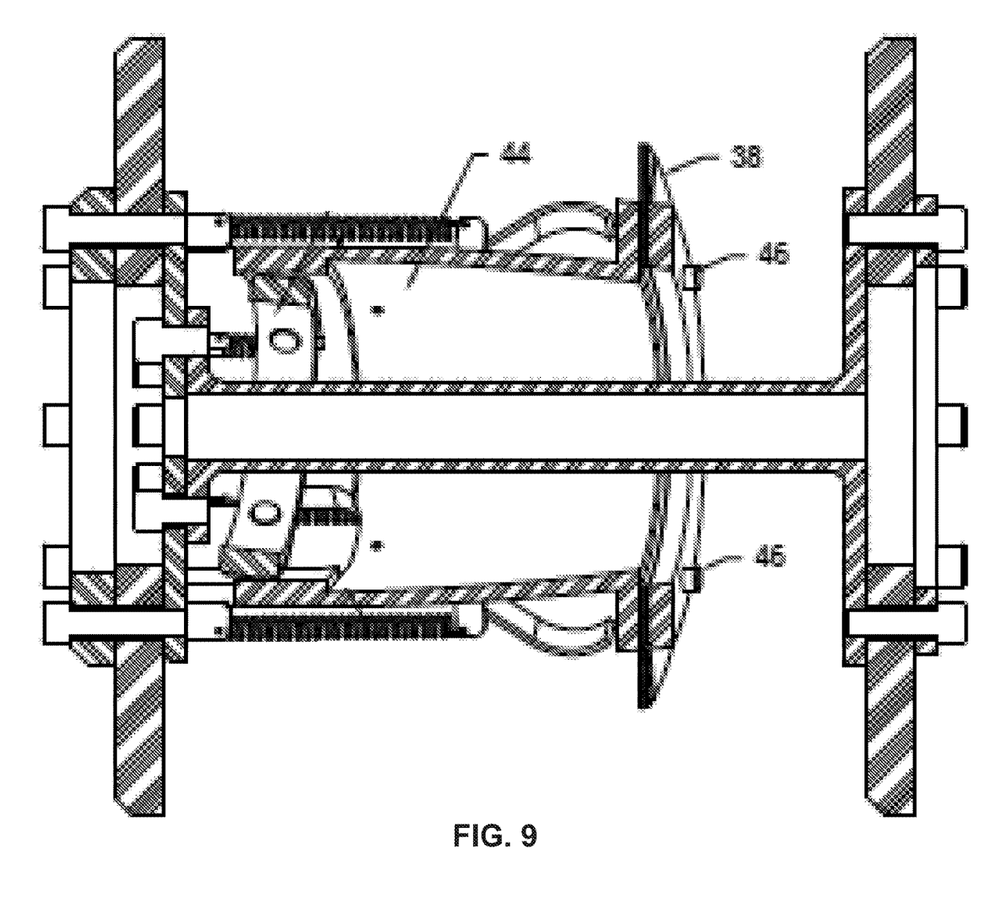
FIG. 9 is a view along section 9-9 of FIG. 7.
Figure 11:
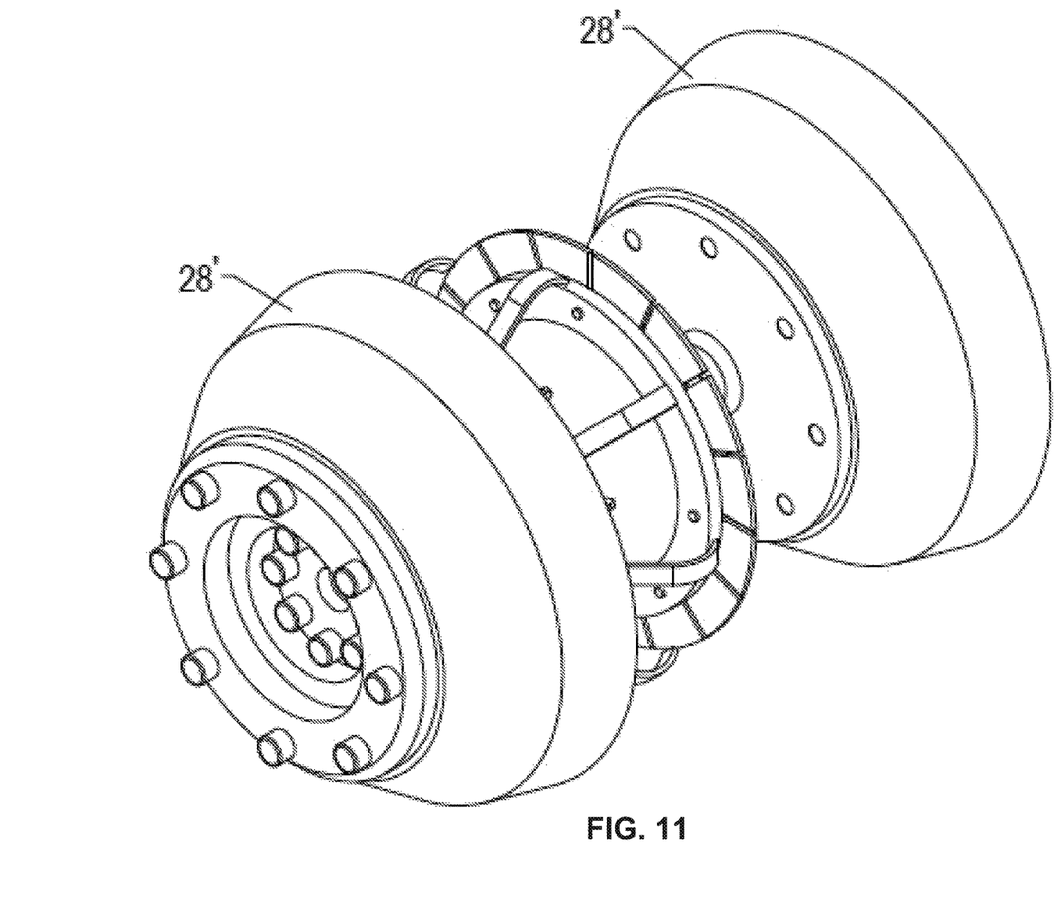
FIG. 11 is a perspective view of apparatus according to another exemplary embodiment.
Figure 12:
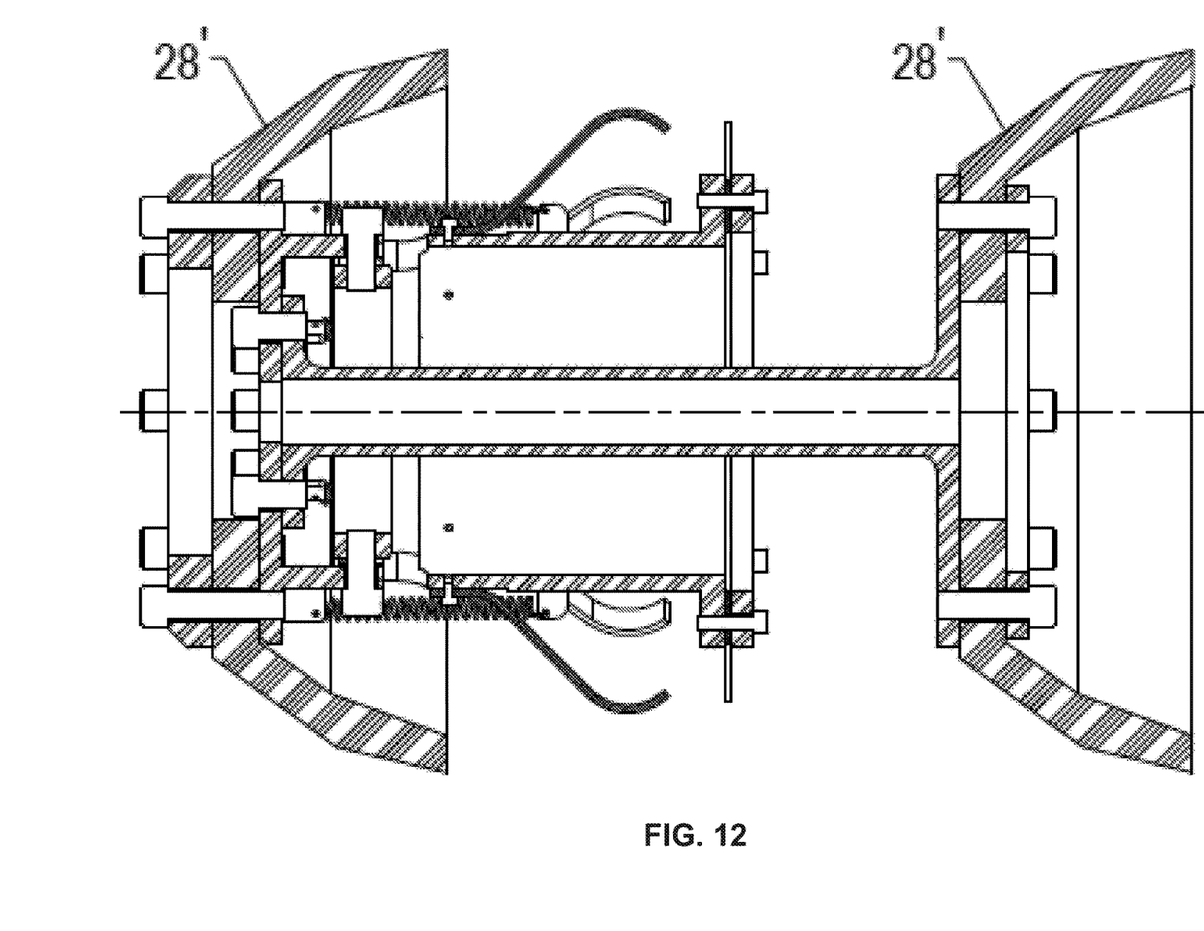
FIG. 12 is a view, similar to FIG. 5, of the structure of FIG. 11.

FIGS. 11 and 12 show a variant of the structure of FIGS. 1-10, wherein cup-shaped seals 28' are substituted for the disc-shaped seals 28 of FIG. 9. This structure functions and is constructed in an analogous fashion to that of FIGS. 1-8 and accordingly further detail is neither required nor provided.

Whereas but two embodiments are herein shown and described, it will be evident that variations are possible.

For example, whereas a segmented disc defines the gauge of the exemplary embodiment, the gauge could be defined by a cup-shaped structure and need not be segmented [not shown].

As well, whereas leaf springs are used for the guide mechanism, the plate could be carried by suspended rollers that traverse the inner surface of the pipeline [not shown]. The plate could also be centred by springs [not shown] or by discs or cups of similar diameter as the leaf springs/rollers.

Further, whereas pivotal movement of the gauge plate is provided in the exemplary embodiment by a pair of perpendicular pivot axes, similar functionality could be provided, for example, by a ball-and-socket joint [not shown].

Further, whereas a specific pivot point is shown, this is not essential; the pivot could, for example, be adjacent the leading edge of the PIG.

Yet further, whereas a pair of seals is indicated, it will be evident that each seal could be defined by a plurality of sealing elements (not shown)

As well, whereas generally radial movement of the gauge is provided by pivotal movement around a distal point, this is not necessary; the gauge could, for example, be suspended from a coil spring [not shown] that surrounded the tubular portion.

Accordingly, the invention should be understood to be limited only by the accompanying claims, purposively construed.

The invention claimed is:

1. An apparatus for use with a pipeline, the apparatus comprising: a pipeline inspection gauge (PIG) for use with the pipeline and being of the type including: a body defining a longitudinal axis; and a pair of seals connected to the body and axially spaced apart from one another by the body; and a gauge: having a longitudinal axis; having an outer periphery through which the longitudinal axis of the gauge passes centrally; having a central position relative to the body wherein the longitudinal axis of the body and the longitudinal axis of the gauge are coincident; and mounted to the body via a knuckle, the knuckle being mounted to the body for pivotal movement around a first axis perpendicular to the longitudinal axis, the gauge being mounted to the knuckle for pivotal movement around a second axis perpendicular to the longitudinal axis and to the first axis, and for radial movement relative to the central position.

2. The apparatus according to claim 1, further comprising a guide mechanism adapted to hold the gauge in equally spaced relation to the pipeline in use.

3. The apparatus according to claim 2, wherein the guide mechanism is defined by a plurality of leaf springs operatively rigidly connected to the gauge.

4. The apparatus according to claim 1, wherein the gauge is a plate having a circular outer circumference.

5. The apparatus according to claim 4, wherein the plate has an annular outer portion bounded exteriorly by the circumference, the outer portion being segmented by a plurality of radially extending slots.

6. The apparatus according to claim 1, wherein the gauge is mounted to the body for pivotal movement about a point coincident with the longitudinal axis.

7. The apparatus according to claim 1, wherein the seals are annular discs.

8. The apparatus according to claim 1, wherein the seals are cups.

9. The apparatus according to claim 1, wherein the seals are flexible and resilient.

10. The apparatus according to claim 1, wherein the body further comprises a hollow tubular portion that surrounds and defines the longitudinal axis, a pair of end plates that are axially spaced apart from one another and rigidly secured to the tubular portion; and a pair of seal clamping plates, each of the seal clamping plates secured by bolts to a respective one of the pair of end plates.

* * * * *